United States Patent
Ali et al.

(10) Patent No.: US 12,520,206 B2
(45) Date of Patent: Jan. 6, 2026

(54) USER EQUIPMENT (UE) POLICY FOR SELECTION OF RADIO ACCESS TECHNOLOGY (RAT) TYPE FOR MOBILITY FROM NON-3GPP TO 3GPP ACCESSES

(71) Applicant: Cisco Technology, Inc., San Jose, CA (US)

(72) Inventors: Irfan Ali, San Francisco, CA (US); Vimal Srivastava, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 726 days.

(21) Appl. No.: 17/752,411

(22) Filed: May 24, 2022

(65) Prior Publication Data
US 2023/0388870 A1 Nov. 30, 2023

(51) Int. Cl.
*H04W 36/00* (2009.01)
*H04W 48/18* (2009.01)
*H04W 84/04* (2009.01)

(52) U.S. Cl.
CPC ....... *H04W 36/0066* (2013.01); *H04W 48/18* (2013.01); *H04W 84/042* (2013.01)

(58) Field of Classification Search
CPC ............. H04W 36/0066; H04W 48/18; H04W 84/042; H04W 36/1446; H04W 36/00222; H04W 88/06
See application file for complete search history.

(56) References Cited

U.S. PATENT DOCUMENTS 9,294,982 B2  3/2016 Srivistava et al.
9,635,686 B2  4/2017 Jain et al.
(Continued)

FOREIGN PATENT DOCUMENTS

EP  2362695 A1  8/2011
EP  2235985 B1  11/2012

OTHER PUBLICATIONS

3GPP, "3rd Generation Partnership Project; Technical Specification Group Services and System Aspects; Service accessibility (Release 13)," 3GPP TS 22.011 V13.6.0, Technical Specification, Jun. 2016, 28 pages.
(Continued)

*Primary Examiner* — Marcus Hammonds
(74) *Attorney, Agent, or Firm* — Edell, Shapiro & Finnan, LLC

(57) ABSTRACT

In one illustrative example, a user equipment (UE) policy may be communicated to a UE. The UE policy may be a UE Route Selection Policy (URSP) which includes a policy rule that associates an application and/or traffic thereof with a routing policy comprising an indicated radio access technology (RAT) type for 3GPP access. When the UE operates to communicate the traffic in a communication session for the application via non-3GPP access, a message which indicates an attach request with a request type indicating "handover" may be received from the UE via a selected radio access network (RAN) corresponding to the indicated RAT type. The message is for triggering a handover of the communication session for the application from the non-3GPP access to the 3GPP access. In one scenario, when Voice over NR (VoNR) is unavailable, the indicated RAT type of the routing policy may be set to indicate an E-UTRAN.

13 Claims, 13 Drawing Sheets

(56) References Cited

U.S. PATENT DOCUMENTS

| | | | |
|---|---|---|---|
| 10,588,052 | B1 | 3/2020 | Srivistava et al. |
| 11,006,344 | B2 | 5/2021 | Huang-Fu et al. |
| 11,071,036 | B2 | 7/2021 | Mukherjee et al. |
| 11,252,627 | B2 | 2/2022 | Ali et al. |
| 11,290,951 | B2 | 3/2022 | Nithiyanantham et al. |
| 2014/0036873 | A1* | 2/2014 | Cheng ............... H04W 36/0033 370/331 |
| 2014/0204904 | A1 | 7/2014 | Xiang et al. |
| 2014/0334444 | A1 | 11/2014 | Sachs et al. |
| 2016/0095050 | A1 | 3/2016 | Lindheimer et al. |
| 2018/0376384 | A1* | 12/2018 | Youn ................... H04W 36/144 |
| 2019/0239271 | A1 | 8/2019 | Guerzoni et al. |
| 2019/0268835 | A1* | 8/2019 | Shan ..................... H04W 48/16 |
| 2020/0187301 | A1* | 6/2020 | Park .................... H04W 60/005 |
| 2020/0359295 | A1 | 11/2020 | Huang-Fu |
| 2020/0404567 | A1 | 12/2020 | Tang |
| 2021/0127314 | A1 | 4/2021 | Mukherjee et al. |
| 2021/0136645 | A1 | 5/2021 | Zhao et al. |
| 2022/0053401 | A1* | 2/2022 | Foti ......................... H04W 8/12 |
| 2022/0338105 | A1* | 10/2022 | Kopperla .............. H04W 24/02 |
| 2022/0345949 | A1* | 10/2022 | Youn ................... H04L 65/1095 |

OTHER PUBLICATIONS

3GPP, "3rd Generation Partnership Project; Technical Specification Group Services and System Aspects; Architecture enhancements for non-3GPP accesses (Release 17)," 3GPP TS 23.402 V17.0.0, Technical Specification, Mar. 2021, 314 pages.

3GPP, 3rd Generation Partnership Project; Technical Specification Group Core Network and Terminals; Access to the 3GPP Evolved Packet Core (EPC) via non-3GPP access networks; Stage 3 (Release 13), 3GPP TS 24.302 V13.7.0, Technical Specification, Sep. 2016, 128 pages.

3GPP, "3rd Generation Partnership Project; Technical Specification Group Core Network and Terminals; Access Network Discovery and Selection Function (ANDSF) Management Object (MO) (Release 16)," 3GPP TS 24.312 V16.0.0, Technical Specification, Jul. 2020, 394 pages.

3GPP, "3rd Generation Partnership Project; Technical Specification Group Core Network and Terminals; User Equipment (UE) policies for 5G System (5GS); Stage 3 (Release 17)," 3GPP TS 24.526 V17.5.0, Technical Specification, Dec. 2021, 57 pages.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 17)," 3GPP TS 23.401 V17.3.0, Technical Specification, Dec. 2021, 450 pages.

3GPP, "3rd Generation Partnership Project; Technical Specification Group Services and System Aspects; System architecture for the 5G System (5GS); Stage 2 (Release 17)," 3GPP TS 23.501 V17.3.0, Technical Specification, Dec. 2021, 559 pages.

3GPP, "3rd Generation Partnership Project; Technical Specification Group Services and System Aspects; Procedures for the 5G System (5GS); Stage 2 (Release 17)," 3GPP TS 23.502 V17.3.0, Technical Specification, Dec. 2021, 727 pages.

Cisco, "PCF Overview," https://www.cisco.com/c/en/us/td/docs/wireless/ucc/pcf/b_ucc-5g-pcf-config-and-admin-guide/m_5g-pcf-overview.pdf, Jan. 2021, 8 pages.

Cisco, "AMF Overview," https://www.cisco.com/c/en/us/td/docs/wireless/ucc/amf/2021-04/config-and-admin/b_ucc-5g-amf-config-and-admin-guide_2021-04/m_amf-overview.html, Nov. 2021, 8 pages.

3GPP, "Discussion on EPS / RAT fallback for IMS voice over ePDG/N3WIF," S2-1909620, 3GPP TSG-SA2 Meeting #135, Oct. 2019, 4 pages.

3GPP, "Indication whether IMS voice over PS session is supported only through EPS-fallback or RAT-fallback," S2-1909669, Change Request, 23.501 CR 1873, Current version: 16.2.0, SA WG2 Meeting #135, Oct. 2019, 3 pages.

3GPP, "Support of VoWiFi handover with EPS/RAT fallback (UE based solution)," S2-1909682, Change Request, 23.502, CR 1841, Current version: 16.2.0, 3GPP TSG-SA2 Meeting #135, Oct. 2019, 3 pages.

3GPP, "Support of VoWiFi handover with EPS/RAT fallback (NW based solution)," S2-1909685, Change Request, 23.502, CR 1843, Current version: 16.2.0, 3GPP TSG-SA2 Meeting #135, Oct. 2019, 4 pages.

3GPP, "Use of EPS/RAT fallback for VoWiFi session," S2-2001577, Change Request, 23.502, CR 1988, rev 3, Current version: 16.3.0, 3GPP TSG-SA2 Meeting #136AH, Jan. 2020, 3 pages.

3GPP, 5G; Policy and charging control framework for the 5G System (5GS); Stage 2 (3GPP TS 23.503 version 15.9.0 Release 15), ETSI TS 123 503, V15.9.0, Technical Specification, Apr. 2021, 86 pages.

3GPP, 5G; Policy and charging control framework for the 5G System (5GS); Stage 2 (3GPP TS 23.503 version 16.5.1 Release 16), ETSI TS 123 503, V16.5.1, Technical Specification, Sep. 2020, 120 pages.

LG Electronics, EPS / RAT fallback for IMS voice over ePDG/N3WIF, S2-1909620, 3GPP TSG-SA2 Meeting #135, Oct. 2019, 8 pages.

ETSI: "5G, 5G System, Access and Mobility Management Services, Stage 3 (3GPP TS 29.518 version 17.5.0 Release 17)", ETSI TS 129 518, V17.5.0, May 2022, pp. 1-406.

ETSI: "5G, 5G System, UE Policy Control Service, Stage 3, (3GPP TS 29.525 version 17.6.0 Release 17)", ETSI TS 129 525, V17.6.0, May 2022, pp. 1-75.

ETSI: "5G, 5G System, Unified Data Repository Services, Stage 3 (3GPP TS 29.504 version 17.6.0 Release 17)", ETSI TS 129 504, V17.6.0, May 2022, pp. 1-54.

ETSI: "5G, 5G System, Usage of the Unified Data Repository Service for Policy Data, Application Data and Structured Data for Exposure, Stage 3, (3GPP TS 29.519 version 17.6.0 Release 17)", ETSI TS 129 519, V17.6.0, May 2022, pp. 1-221.

ETSI: "5G, Access to the 3GPP 5G Core Network (5GCN) via non-3GPP Access Networks (3GPP TS 24.502 version 17.5.0 Release 17)", ETSI TS 124 502, V17.5.0, May 2022, pp. 1-97.

* cited by examiner

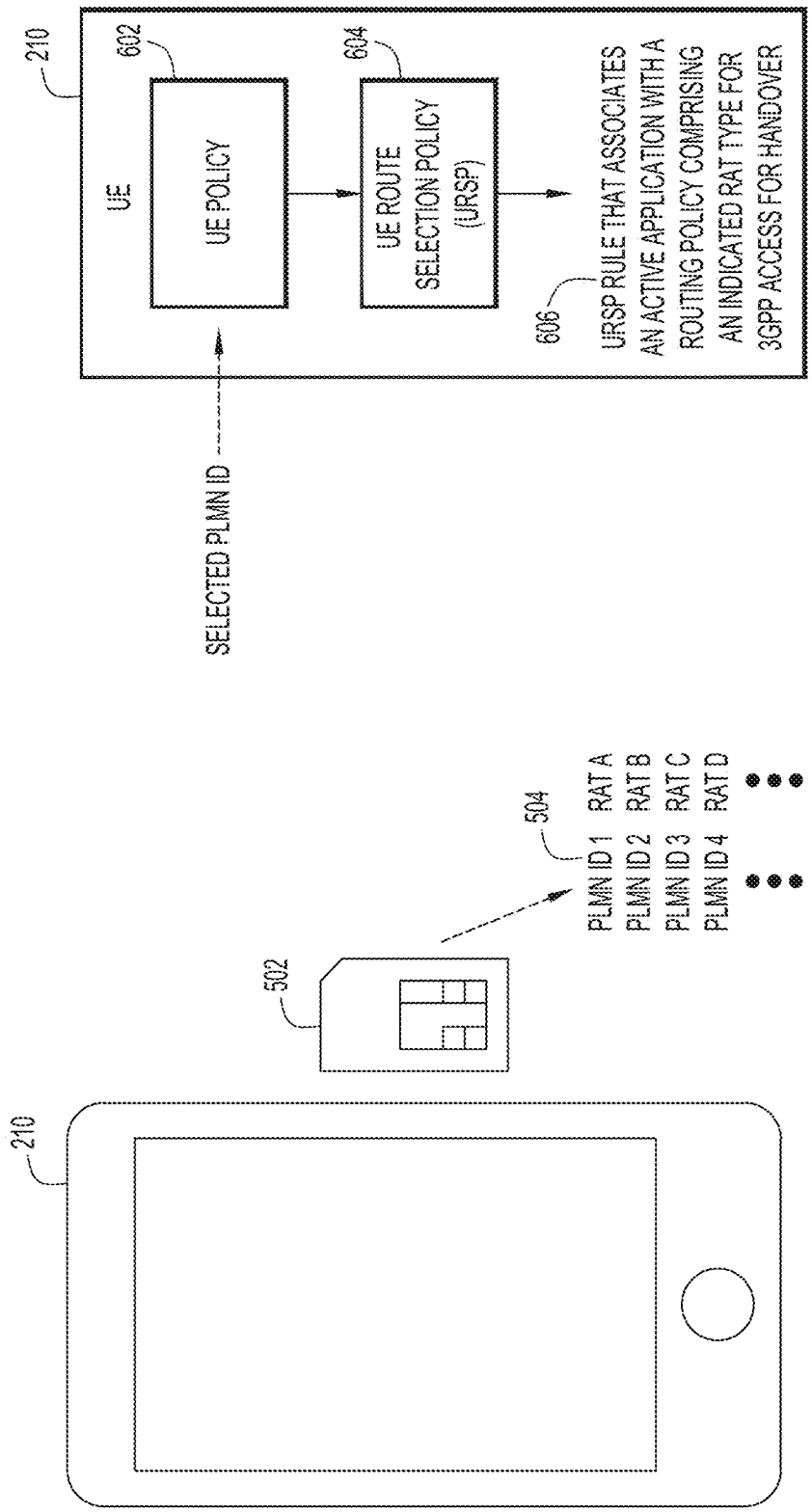

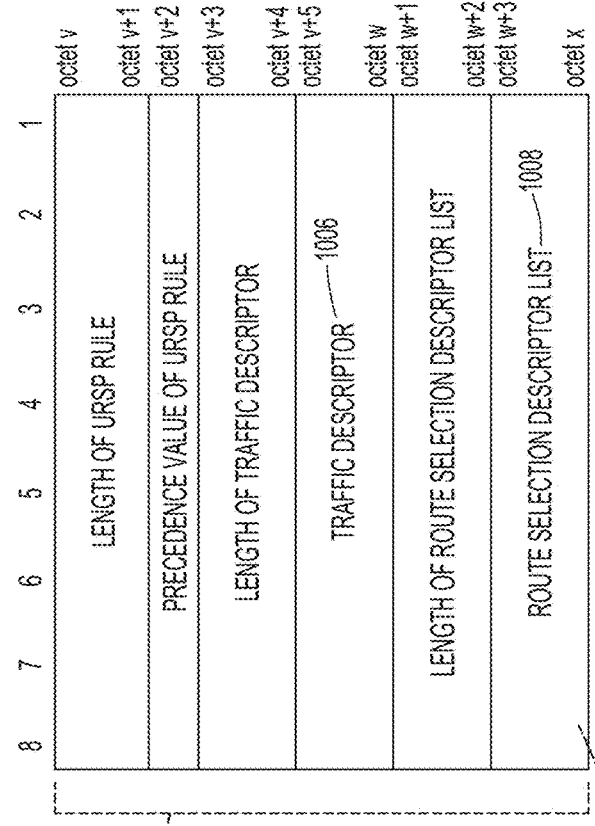
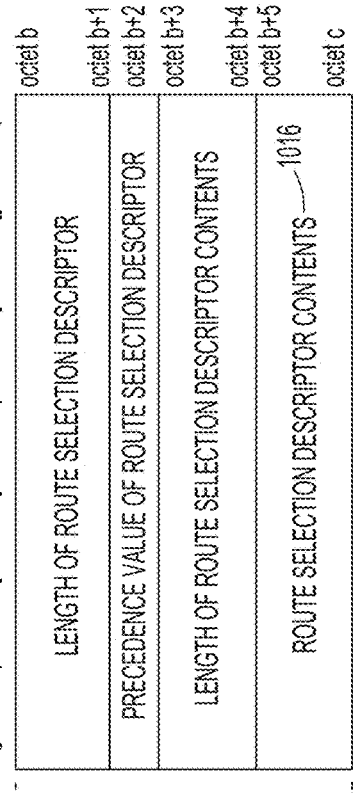
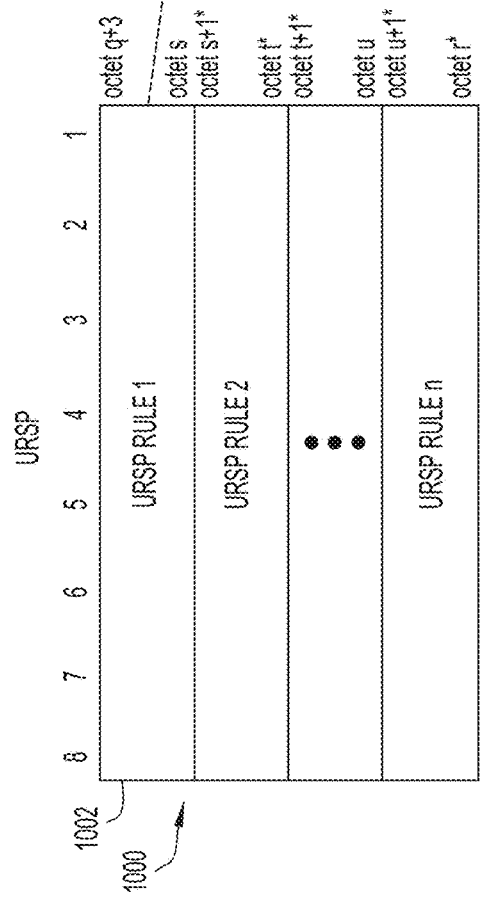
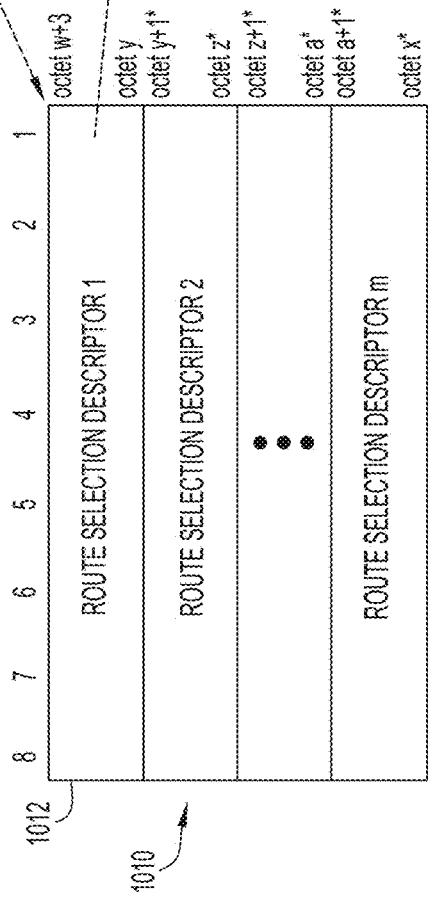
FIG. 10

1100

| TRAFFIC DESCRIPTOR COMPONENT TYPE IDENTIFIER | |
|---|---|
| BITS | |
| 8 7 6 5 4 3 2 1 | |
| 0 0 0 0 0 0 0 1 | MATCH-ALL TYPE |
| 0 0 0 0 1 0 0 0 | OS ID + OS APP ID TYPE (NOTE 1)(NOTE 3) |
| 0 0 0 1 0 0 0 0 | IPV4 REMOTE ADDRESS TYPE |
| 0 0 1 0 0 0 0 1 | IPV6 REMOTE ADDRESS/PREFIX LENGTH TYPE |
| 0 0 1 1 0 0 0 0 | PROTOCOL IDENTIFIER/NEXT HEADER TYPE |
| 0 1 0 0 0 0 0 0 | SINGLE REMOTE PORT TYPE |
| 0 1 0 1 0 0 0 1 | REMOTE PORT RANGE TYPE |
| 0 1 0 1 0 0 1 0 | IP 3 TUPLE TYPE |
| 0 1 1 0 0 0 0 0 | SECURITY PARAMETER INDEX TYPE |
| 0 1 1 1 0 0 0 0 | TYPE OF SERVICE/TRAFFIC CLASS TYPE |
| 1 0 0 0 0 0 0 0 | FLOW LABEL TYPE |
| 1 0 0 0 0 0 0 1 | DESTINATION MAC ADDRESS TYPE |
| 1 0 0 0 0 0 1 1 | 802.1Q C-TAG VID TYPE |
| 1 0 0 0 0 1 0 0 | 802.1Q S-TAG VID TYPE |
| 1 0 0 0 0 1 0 1 | 802.1Q C-TAG PCP/DEI TYPE |
| 1 0 0 0 0 1 1 0 | 802.1Q S-TAG PCP/DEI TYPE |
| 1 0 0 0 0 1 1 1 | ETHERTYPE TYPE |
| 1 0 0 0 1 0 0 0 | DNN TYPE (NOTE 3) |
| 1 0 0 1 0 0 0 0 | CONNECTION CAPABILITIES TYPE (NOTE 3) |
| 1 0 0 1 0 0 0 1 | DESTINATION FQDN |
| 1 0 0 1 0 0 1 0 | REGULAR EXPRESSION |
| 1 0 1 0 0 0 0 0 | OS APP ID TYPE (NOTE 3) |

FOR "CONNECTION CAPABILITIES" TYPE, THE TRAFFIC DESCRIPTOR COMPONENT VALUE FIELD SHALL BE ENCODED AS A SEQUENCE OF ONE OCTET FOR NUMBER OF NETWORK CAPABILITIES FOLLOWED BY ONE OR MORE OCTETS, EACH CONTAINING A CONNECTION CAPABILITY IDENTIFIER ENCODED AS FOLLOWS:

BITS
8 7 6 5 4 3 2 1
0 0 0 0 0 0 0 1    IMS
0 0 0 0 0 0 1 0    MMS
0 0 0 0 0 1 0 0    SUPL
0 0 0 0 1 0 0 0    INTERNET
ALL OTHER VALUES ARE SPARE. IF RECEIVED THEY SHALL BE INTERPRETED AS UNKNOWN.

FIG.11

USER EQUIPMENT (UE) POLICY FOR SELECTION OF RADIO ACCESS TECHNOLOGY (RAT) TYPE FOR MOBILITY FROM NON-3GPP TO 3GPP ACCESSES

TECHNICAL FIELD

The present disclosure relates generally to telecommunications systems, and more particularly to techniques and mechanisms for providing and using a user equipment (UE) policy for selection of a radio access technology (RAT) type (or other preferred type of network feature) for UE mobility from non-Third Generation Partnership Project (non-3GPP) access to 3GPP access.

BACKGROUND

A Third Generation Partnership Project (3GPP) based mobile network may provide 3GPP access for a user equipment (UE) via an Enhanced Universal Radio Access Network (E-UTRAN) and a Next Generation (NG) Radio Access Network (RAN) (NG-RAN). In some cases, the 3GPP-based mobile network may support Voice over Long-Term Evolution (VoLTE) in the E-UTRAN but not yet offer Voice over New Radio (VoNR) in the NG-RAN. Here, when the UE attempts to establish a voice call using VoNR, Evolved Packet System (EPS) fallback for establishing the voice call in the EPS (i.e., using VoLTE) will occur instead.

A UE may also be provided access to the network via a non-3GPP access technology, such as Wi-Fi. In such an environment, consider the following scenario.
1. A UE maintains a voice call via non-3GPP access, such as Wi-Fi. The voice call may be maintained, for example, using voice over enhanced Packet Data Gateway (ePDG) or even via a non-3GPP Interworking Function (N3IWF) connected to a 5G Core (5GC).
2. The UE moves out of Wi-Fi coverage and discovers the 3GPP access for handover of the voice call.
3. The voice call is handed over to New Radio (NR) (i.e., 5G), since most operators prefer the UE to switch to NR rather than LTE (i.e., for prioritizing use of 5G).
4. Since the mobile network does not yet support VoNR, the UE initially registers using NR and subsequently sets up a dedicated voice bearer which then causes fallback to EPS.

The above-described multi-step operation (e.g., the two-step process of switching from Wi-Fi to NR, and then from NR to LTE) is undesirable as it assumes that the preferred radio access technology (RAT) type for 3GPP will always be NR. Currently, there is no suitable way to influence the UE to switch to LTE/EPS for 3GPP when the UE is connected in a voice call via Wi-Fi. This problem is actually a generic problem when considering all connected mode mobility events (handovers) from non-3GPP access to 3GPP access.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is an illustrative representation of a UE which may operate to perform a Public Land Mobile Network (PLMN) selection procedure with use of one or more lists of PLMN IDs indicated in a Subscriber Identity Module (SIM) of the UE, for identifying a selected PLMN and a RAT type for communication via 3GPP access;

FIG. 6 is another illustrative representation of the UE of FIG. 5, which may operate to receive and store a UE policy, which may be a UE Route Selection Policy (URSP) having a list of URSP rules, at least one of which associates an active application with a routing policy comprising an indicated RAT type for 3GPP access, which may be used to override the RAT type as indicated in the SIM of the UE of FIG. 5;

FIG. 10 is an illustrative representation of a message formatting of a URSP having a list of URSP rules, each one of which includes a traffic descriptor associated with a list of route selection descriptors, which may be used in connected mode mobility from non-3GPP access to 3GPP access according to some implementations of the present disclosure;

FIG. 11 are conventional data definitions associated with traffic descriptor component type identifiers for the traffic descriptor for each one of the URSP rules in the URSP of FIG. 10, which may be used in connected mode mobility from non-3GPP access to 3GPP access according to some implementations of the present disclosure;

DESCRIPTION OF EXAMPLE EMBODIMENTS

Figure 1:
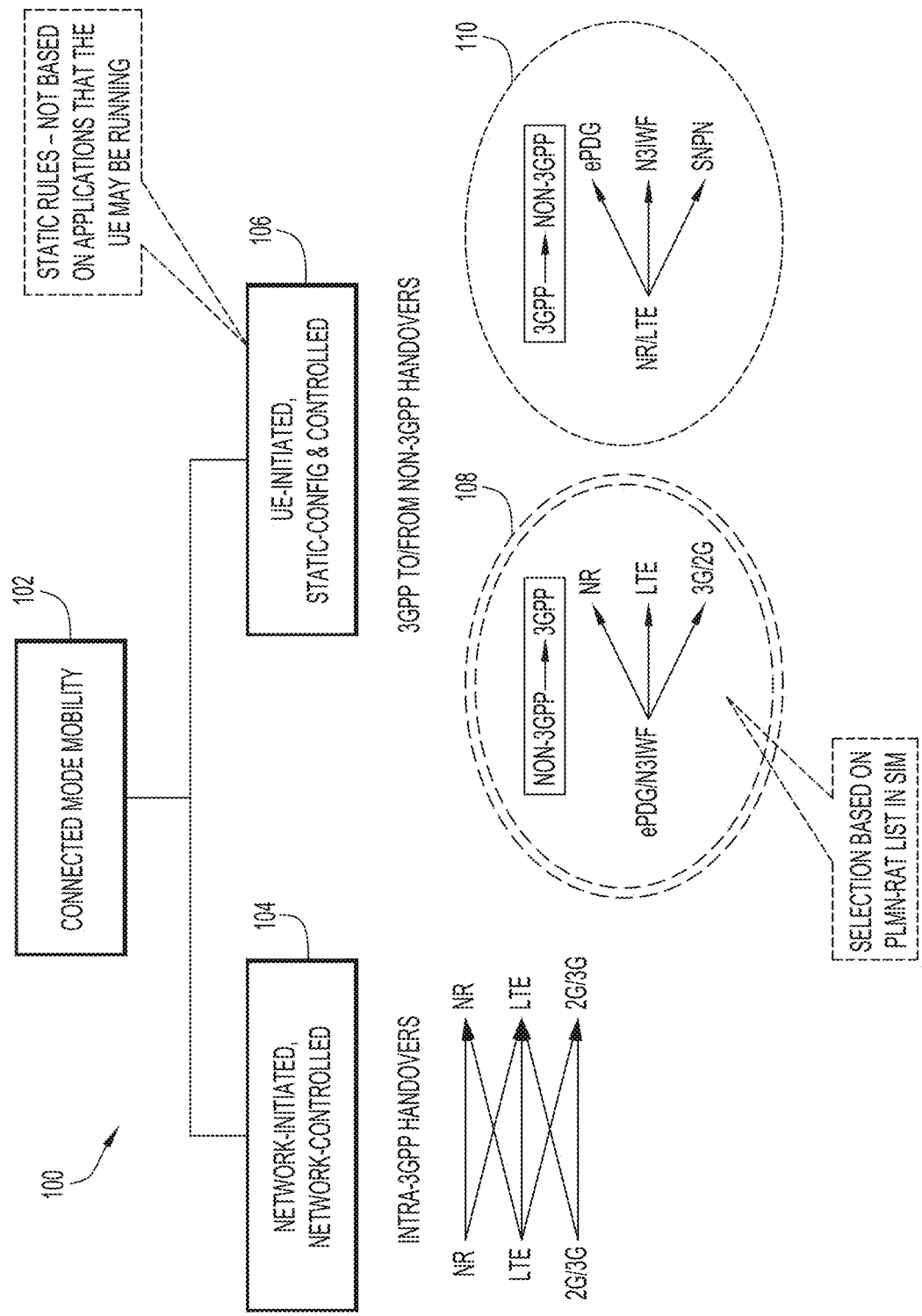
FIG. 1 is an illustrative diagram for describing conventional operation for a connected mode mobility of a user equipment (UE) operating in Third Generation Partnership (3GPP) networks and non-3GPP networks.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms are described herein for providing and using a user equipment (UE) policy for selection of a radio access technology (RAT) type (or other preferred type of network feature) for UE mobility from non-Third Generation Partnership Project (non-3GPP) access to 3GPP access.

In one illustrative example, a UE policy may be communicated (e.g., by the network and/or network entity) for receipt by a UE. The UE policy may include a policy rule that associates an application and/or traffic thereof with a routing policy comprising an indicated RAT type for 3GPP access. The UE may operate to communicate traffic for the application in a communication session via non-3GPP access. A message which indicates an attach request may be received from the UE via a selected radio access network (RAN) corresponding to the indicated RAT type of the routing policy. The message which indicates the attach request may have a request type indicating a handover attach, for triggering a handover of a communication session for the application from the non-3GPP access to the 3GPP access of the indicated RAT type. In some implementations, the UE policy may be a UE Route Selection Policy (URSP) and the policy rule may be a URSP rule.

In some implementations, the message which indicates the attach request may be received in a 3GPP-based mobile network which is configured to provide the 3GPP access via an Evolved Universal Terrestrial Radio Access Network (E-UTRAN) and a Next Generation RAN (NG-RAN), and the indicated RAT type of the routing policy may be set to indicate one of the E-UTRAN or the NG-RAN. In further implementations, the application may be a voice application, the communication session may be a voice communication session, and the indicated access technology type of the routing policy may be set to indicate the E-UTRAN when Voice over NR (VoNR) is unavailable in the NG-RAN of the 3GPP-based mobile network.

In another illustrative example, a UE may be configured to operate to communicate traffic for an application in a communication session via non-3GPP access. The UE may operate to evaluate a UE policy to identify a policy rule that associates the application and/or the traffic thereof with a routing policy comprising an indicated RAT type for 3GPP access. The UE may further operate to cause a message which indicates an attach request to be sent via a selected RAN corresponding to the indicated RAT type of the routing policy. The message which indicates the attach request may have a request type indicating a handover attach, for triggering a handover of the communication session for the application from the non-3GPP access to the 3GPP access of the indicated RAT type. In some implementations, the UE policy may be a URSP and the policy rule may be a URSP rule.

In some implementations, the message which indicates the attach request may be sent to a 3GPP-based mobile network which is configured to provide the 3GPP access via an E-UTRAN and an NG-RAN, and the indicated RAT type of the routing policy may be set to indicate one of the E-UTRAN or the NG-RAN. In further implementations, the application may be a voice application, the communication session may be a voice communication session, and the indicated access technology type of the routing policy may be set to indicate the E-UTRAN when VoNR is unavailable in the NG-RAN of the 3GPP-based mobile network.

More detailed and alternative techniques and implementations are provided herein as described below.

Example Embodiments

As described in the Background section, the multi-step operation for handover of a voice communication session of a user equipment (UE) from Wi-Fi to New Radio (NR), and then from NR to Long-Term Evolution (LTE) when Voice over NR (VoNR) is unavailable, is undesirable and assumes that the preferred radio access technology (RAT) type for Third Generation Partnership Project (3GPP) access will always be NR. Currently, there is no suitable way to influence the UE to switch to LTE when the UE is connected in a voice communication session via Wi-Fi.

The above-described problem is actually a generic problem when considering all connected mode mobility events (handovers) from non-3GPP access to 3GPP access. To further explain, FIG. 1 is an illustrative diagram 100 for describing conventional operation for a connected mode mobility 102 of a UE which is operative in 3GPP networks and non-3GPP networks. Connected mode mobility 102 of the UE may involve handover types 104 that are network-initiated and network-controlled, such as for intra-3GPP handovers (HOs) amongst different RAT types for 3GPP access as indicated in FIG. 1. Connected mode mobility 102 of the UE may also involve handover types 106 that are UE-initiated, statically-configured and controlled, such as for handovers between 3GPP and non-3GPP accesses as indicated in FIG. 1. For these handover types 106, the rules for handover are mostly static and are not based on active applications that are running in the UE.

More specifically, handover types 106 that are UE-initiated include "non-3GPP to 3GPP access" handover types 108 and "3GPP to non-3GPP access" handover types 110. For 3GPP to non-3GPP access handover types 110, the rules for selection and handover are based on an Access Network Discovery and Selection Policy (ANDSP) (e.g., for evolved Packet Data Gateway (ePDG) selection or non-3GPP Interworking Function (N3IWF) selection). For non-3GPP to 3GPP access handover types 108, the rules for selection and handover are based on a list of Public Land Mobile Network (PLMN) IDs and associated RAT types as indicated in a Subscriber Identity Module (SIM) card of the UE. Note that information in the SIM card of the UE is typically static and, due to SIM limitations, the SIM card cannot be made dynamic nor involve complex rules that are, for example, based on active applications that the UE is currently running.

Conventionally in 5G, the UE may utilize UE Route Selection Policy (URSP) rules for establishing communications over a Protocol Data Unit (PDU) session (e.g., for a newly-invoked application, establish a new PDU session or use an existing PDU session). The URSP associates traffic descriptors of applications with the route selection policies. According to 3GPP specifications, URSP rules may be used and evaluated if the upper layer requests the modem of the UE for information. URSP rules are generally not evaluated during handovers, but rather utilized for creating a new PDU session or using an existing PDU session for newly-invoked applications.

As described earlier in the Background section, a 3GPP-based mobile network may provide 3GPP access for a UE via an E-UTRAN and an NG-RAN. Traditionally, cellular networks have been designed to provide communications for UEs according to 3GPP standards, such as 4G/LTE/Evolved Packet Core (EPC) standards. The 3GPP-defined EPC of the Evolved Packet System (EPS) includes a Mobility Management Entity (MME), a Packet Data Network (PDN) Gateway (PGW), and a Serving Gateway (SGW). In a more advanced Control and User Plane Separation (CUPS) architecture of the EPC, the PGW may be separated into a PGW-Control Plane (PGW-C) and a PGW-User Plane (PGW-U), and the SGW may be separated into an SGW-Control Plane (SGW-C) and an SGW-User Plane (SGW-U). Today, cellular networks are being upgraded or migrated to 5G technology. A 5G System (5GS) utilizes RATs/RAN technologies and core functions that are different from the EPS. A 5G deployment is based on the 5G Core (5GC) defined in the 3GPP specifications, and includes functions such as an Access and Mobility Management Function (AMF), a Session Management Function (SMF), a Policy Control Function (PCF), and a User Plane Function (UPF).

Interworking between 4G and 5G will play an important role in the deployment of 5G, which will initially rely on the 4G/LTE/EPC as its underlying system. In the 3GPP architecture for interworking, "combined" or "converged" components are provided for implementing what is referred to as a "converged 4G/5G network." For example, the SMF and the PGW-C may be provided as a combined entity (i.e., an SMF+PGW-C), and the UPF and the PGW-U may be provided as a combined entity (i.e., a UPF+PGW-U). Here, the SMF+PGW-C may operate to maintain a control signalling session, via an N4/Sx interface, with the UPF+PGW-U for managing a PDU session/Packet Data Network (PDN) connection for the UE. Since the SMF+PGW-C serves as a dedicated control plane "anchor" for the PDU session/PDN connection, session continuity and IP address preservation allow a UE to move seamlessly from one system to the other.

Figure 2:
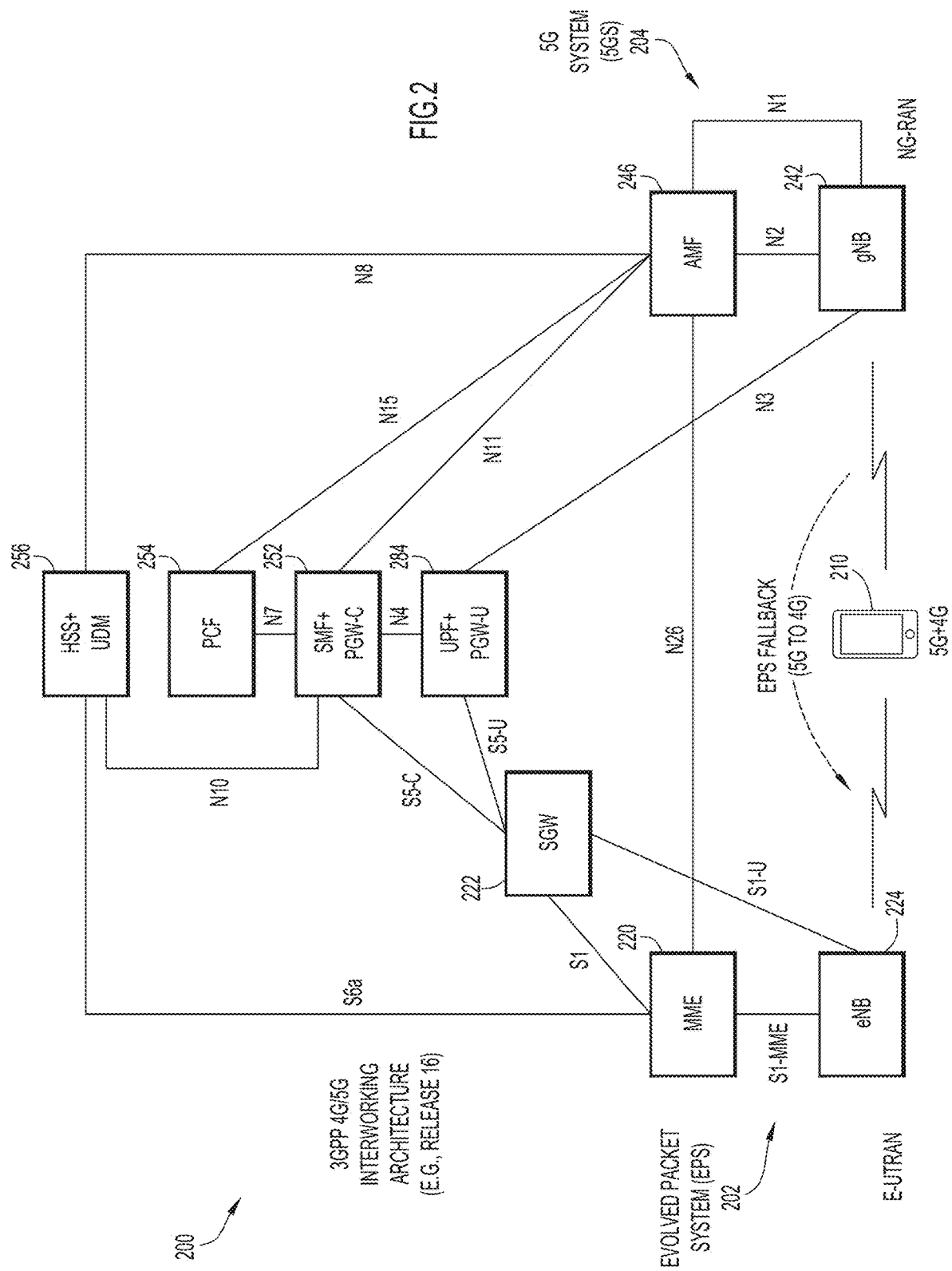
FIG. 2 is an illustrative representation of a 3GPP-based mobile network operative to provide 3GPP access for the UE, which includes a converged core architecture for interworking between an Evolved Packet System (EPS) and a Fifth Generation (5G) System (5GS), for thereby enabling 5G to 4G mobility for the UE, as well as for facilitating EPS fallback for the UE when Voice over New Radio (VoNR) is unavailable in the 3GPP-based mobile network.

To further explain in relation to the figures, FIG. 2 is an illustrative representation of a 3GPP-based mobile network 200 operative to provide 3GPP access for a UE 210, including a converged core architecture for interworking between an EPS 202 and a 5GS 204. This architecture enables 5G to 4G mobility for UE 210, and facilitates EPS fallback for UE 210 when VoNR is unavailable in the 3GPP-based mobile network 200.

As shown in FIG. 2, EPS 202 of 3GPP-based mobile network 200 includes an E-UTRAN and an EPC. At least in some contexts, EPS 202 may be referred to as a 4G system. The E-UTRAN of FIG. 2 may be for LTE-based access, and may include one or more base stations such as an eNodeB (eNB) 224. The EPC of EPS 202 may include at least an MME 220 and a SGW 222. In some implementations, the EPC of EPS 202 may include a CUPS architecture, where SGW 222 is separated into an SGW-C and an SGW-U.

Further as shown in FIG. 2, the 5GS 204 of 3GPP-based mobile network 200 includes a Next-Generation (NG) RAN (NG-RAN) and a 5GC. The NG-RAN is for 5G radio access, and may include one or more base stations such as a gNodeB (gNB) 242. The 5GC of 5GS 204 may include an AMF 246 and a PCF 254. As is apparent, different RATs and core functions are utilized between 4G and 5G. Note that standards for 5GS 204 are provided in 3GPP specifications which include 3GPP Technical Specification (TS) 23.501 and 3GPP TS 23.502.

For interworking between 5GS 204 and EPS 202, 3GPP-based mobile network 200 may include (interworking) user plane functionality, (interworking) control plane functionality for session management, and (interworking) subscriber data management functionality. The (interworking) user plane functionality may be or include a UPF plus PGW-U (UPF+PGW-U) 284. The (interworking) control plane functionality for session management may be or include an SMF plus PGW-C(SMF+PGW-C) 252. The (interworking) subscriber data management may be or include a Home Subscriber Server (HSS) plus Unified Data Management (UDM) (HSS+UDM) 256.

Interfaces between the elements, functions, or modules in 3GPP-based mobile network 200, such as interfaces for N1, N2, N3, N4, N7, N8, N10, N11, N15, N26 S1-MME, S1-U, S5-C, S5-U, and S6a, are described in relevant 3GPP specifications. In particular, the N26 interface between AMF 246 and MME 220 has been introduced to be an inter-core network (CN) interface for interworking between 5GS 204 and EPS 202.

A UE 210 is operative for communications in 3GPP-based mobile network 200. More particularly, UE 210 may operate for communications in a selected one of EPS 202 (i.e., 4G) or 5GS 204. Here, UE 210 may be provided with radio access via the E-UTRAN (e.g., eNB 224) or the NG-RAN (e.g., gNB 242). In some implementations, UE 210 operates to prioritize the selection of operation in 5GS 204 (i.e., prioritized over EPS 202) when 5G is available. UE 210 may be any suitable type of device configured for communications, such as a cellular telephone, a smart phone, a tablet device, a gaming device or application, an Internet of Things (IoT) device, and a Machine-To-Machine (M2M) device, to name but a few.

In FIG. 2, UE 210 is shown to operate via the NG-RAN (e.g., gNB 242) in 5GS 204, but may subsequently need to communicate via the E-UTRAN (e.g., eNB 224) in EPS 202. Here, UE 210 may be switched to communications via the E-UTRAN (e.g., eNB 224) in EPS 202, for example, responsive to a relocation with 5G coverage loss or due to "EPS fallback" for a voice call. EPS fallback may be commonplace in early 5G deployments, enabling the 3GPP-based mobile network 200 to provide UE 210 with communications prior to completion of all required voice configurations in the NG-RAN and/or UE 210 (e.g., before the NG-RAN is dimensioned and tuned for voice). With EPS fallback, when UE 210 attempts to establish a voice call, the communications of UE 210 may be switched from NR to LTE (i.e., 4G) to provide suitable voice communications. Over time, when the required voice configurations in the NG-RAN and/or UE 210 are completed, VoNR calls in 5GS 204 will be permitted and EPS fallback may be utilized less frequently or discontinued.

Thus, in some cases, 3GPP-based mobile network 200 may support VoLTE in the E-UTRAN but may not yet offer VoNR in the NG-RAN. When UE 210 attempts to establish a voice call using VoNR, EPS fallback for establishing the voice call in EPS 202 (i.e., VoLTE) will occur instead.

Figure 3:
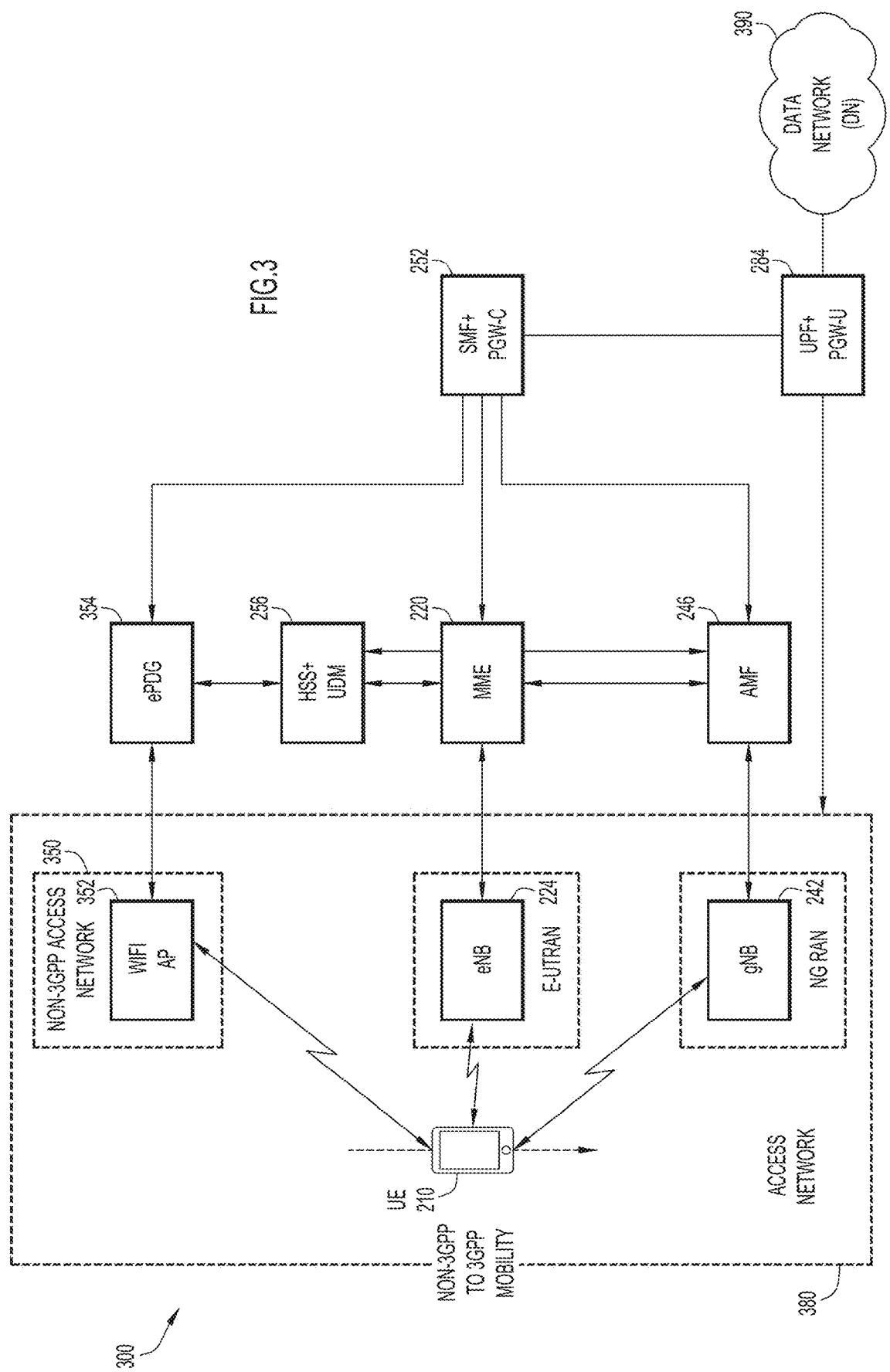
FIG. 3 is an illustrative representation of a mobile network configured to provide for 3GPP access and non-3GPP access for the UE, for providing and/or using a UE policy for selection of a radio access technology (RAT) type (or other preferred type of network feature) for UE mobility from non-3GPP access to 3GPP access.

Similar operation may occur when UE 210 maintains a voice call via non-3GPP access (e.g., Wi-Fi). To better illustrate, FIG. 3 is illustrative representation of a 3GPP-based mobile network 300 configured to provide both 3GPP access and non-3GPP access for UE 210. The 3GPP-based mobile network 300 may facilitate communications of UE 210 to/from a data network (DN) 390. In 3GPP-based mobile network 300, an access network 380 thereof may include the E-UTRAN (e.g., eNB 224), the NG-RAN (e.g., gNB 242), and a non-3GPP access network 350 having one or more Wi-Fi Access Points (APs) 352. The 3GPP-based mobile network 300 may include the interworking operation between the 5GS and the EPS as described in relation to FIG. 2. Communications for UE 210 having non-3GPP access may be routed via an enhanced Packet Data Gateway (ePDG) 354.

When UE 210 maintains a voice call through Wi-Fi AP 352 and ePDG 354, and then moves out of Wi-Fi coverage, it will discover the 3GPP access and handover the voice call. Here, UE 210 will initially register with the network via the NG-RAN (e.g., gNB 242) and then setup a dedicated voice bearer which causes fallback to the EPS via the E-UTRAN (e.g., eNB 224). This multi-step operation for call establishment due to EPS fallback may be considered to be clumsy and unnecessary.

What is provided herein is mobile operator control to influence a UE to select a preferred RAT type for mobility from non-3GPP to 3GPP access based on UE policy (e.g., URSP rules that have been introduced in 5G). According to some implementations, the techniques and mechanisms of the present disclosure may be based on the following:

1. Creating new kinds of URSP rules that influence 3GPP-RAT selection on non-3GPP to 3GPP mobility; and
2. Providing selection that is influenced based on the application and/or the traffic that the UE is currently running. In some implementations, an application ID of the (active) application (e.g., an active voice call application or other) may be input for selection of the appropriate route selection policy.

Figure 4:
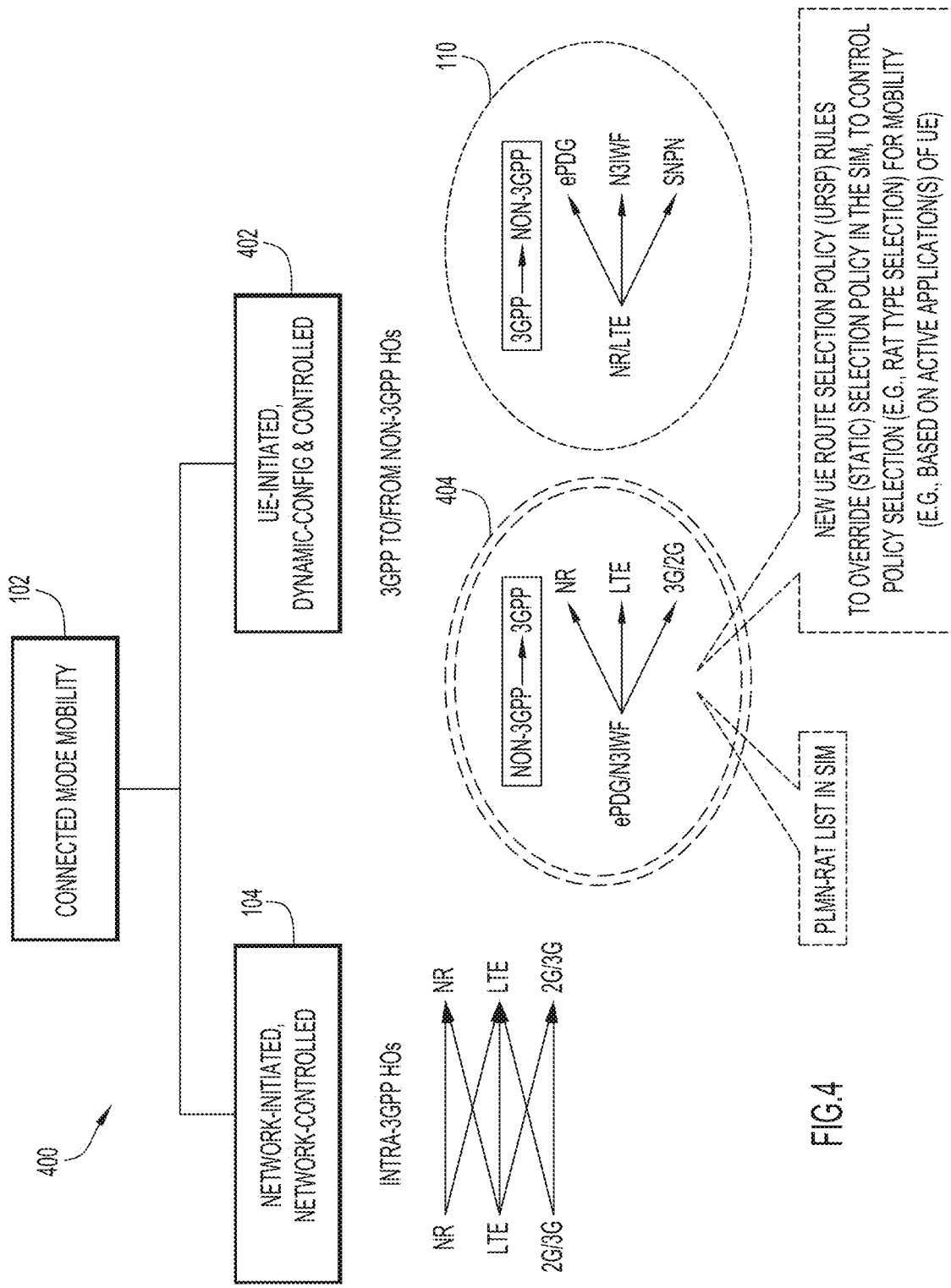
FIG. 4 is an illustrative diagram for describing operation for the connected mode mobility of the UE according to some implementations of the present disclosure, for providing and/or using a UE policy for selection of a RAT type (or other preferred type of network feature) for UE mobility from non-3GPP access to 3GPP access.

FIG. 4 is an illustrative diagram 400 for describing operation for the connected mode mobility 102 of a UE according to some implementations of the present disclosure. As described earlier, connected mode mobility 102 of the UE may involve handover types 104 that are network-initiated and network-controlled, such as for intra-3GPP handovers amongst different RAT types for 3GPP access as indicated in FIG. 4. According to some implementations, connected mode mobility 102 of the UE may also involve handover types 402 that are UE-initiated, and (now) dynamically-configurable and controlled (e.g., by a mobile network operator). These handover types 402 may be for handovers between 3GPP and non-3GPP accesses as indicated in FIG. 4. For at least some of handover types 402, the rules for handover may be dynamically configurable and based on active applications that are running in the UE.

More specifically, handover types 402 that are UE-initiated include "non-3GPP to 3GPP access" handover types 404 and "3GPP to non-3GPP access" handover types 110. For 3GPP to non-3GPP access handover types 110, the rules for selection and handover may be based on the ANDSP as described previously (e.g., for ePDG selection or N3IWF selection). For non-3GPP to 3GPP access handover types 404, the rules for selection and handover may be based at least in part on a list of PLMN IDs (of a PLMN-RAT list) as indicated in a SIM card of the UE. Also, for non-3GPP to 3GPP access handover types 404, the rules for handover may be based on a UE policy for selection of a RAT type (or other preferred type of network feature) for 3GPP access. Here, the UE policy may include a policy rule that associates an (active) application and/or traffic thereof with a routing policy comprising an indicated RAT type for the 3GPP access. In some implementations, the UE policy may be a URSP having a list of URSP rules, where each URSP rule may associate an application ID of an (active) application with the indicated RAT type for the 3GPP access. For handover from non-3GPP access to 3GPP access, the indicated RAT type for 3GPP access may be used to override the RAT type associated with the selected PLMN ID as indicated in the SIM of the UE.

FIG. 5 is an illustrative representation of UE 210 which may operate to perform a PLMN selection procedure with use of one or more lists of PLMN IDs 504 indicated in a SIM 502 of the UE 210. During handover from non-3GPP to 3GPP access, UE 210 may use the PLMN selection procedure for obtaining a selected PLMN ID of a PLMN and a RAT type. FIG. 6 is another illustrative representation of the same UE 210 which may operate to receive and store a UE policy 602. UE policy 602 may be selected and/or obtained by UE 210 based on the selected PLMN ID which is obtained according to the PLMN selection procedure (i.e., there may be a plurality of different UE policies, one UE policy for each PLMN). UE policy 602 may be or include a URSP 604 having a list of URSP rules, including at least one URSP rule 606 of which associates an active application with a routing policy comprising an indicated RAT type for 3GPP access. For handover from non-3GPP access to 3GPP access, the indicated RAT type for 3GPP access may be used to override the RAT type associated with the selected PLMN ID (as indicated in the SIM of the UE 210) (e.g., FIG. 5). Note further that use of UE policy 602 from the mobile network operator should override any local pre-configured settings or techniques that may be offered or provided by UE 210, which would be based on less current and/or less reliable information than that of the operator.

Figure 7:
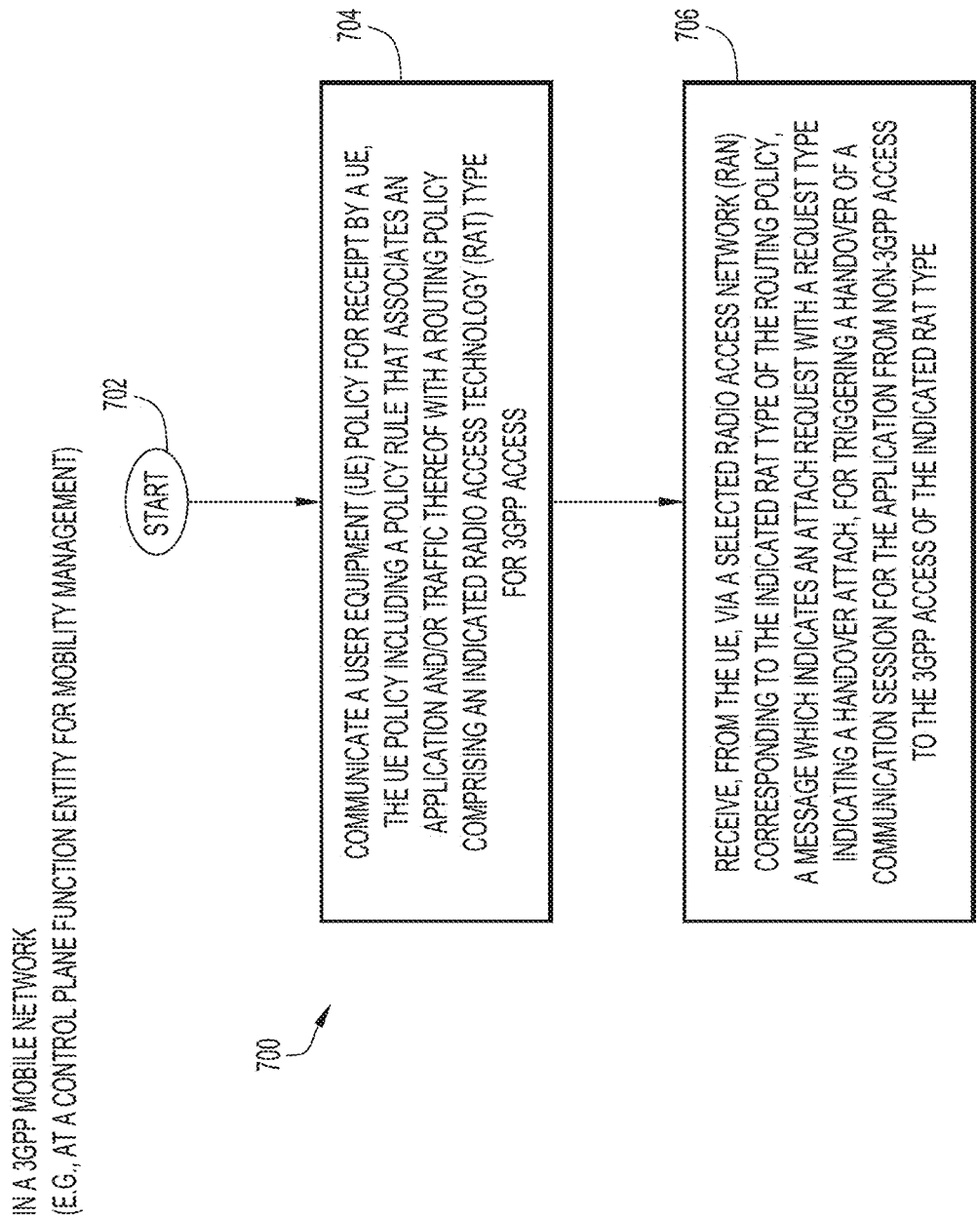
FIG. 7 is a flowchart for describing a method of providing a UE policy for selection of a RAT type for UE mobility from non-3GPP access to 3GPP access according to some implementations of the present disclosure, which may be performed by a control plane function entity of the mobile network.

FIG. 7 is a flowchart 700 for describing a method for use in providing a UE policy for use in selection of a RAT type for UE mobility from non-3GPP access to 3GPP access according to some implementations of the present disclosure. The method of FIG. 7 may be performed by a 3GPP-based mobile network configured to provide for 3GPP access, and more particularly, by one or more control plane function entities in the 3GPP-based mobile network configured to provide for 3GPP access (e.g., a control plane function for mobility management, such as an MME or an AMF). The method of FIG. 7 may be embodied in a computer program product which includes a non-transitory computer readable medium and instructions stored in the non-transitory computer readable medium, where the instructions are executable by one or more processors of a network node having the control plane function entity.

The 3GPP-based mobile network configured to provide for 3GPP access may provide communications for a UE. Beginning at a start block 702 of FIG. 7, the 3GPP-based mobile network may communicate a UE policy for receipt by the UE (step 704 of FIG. 7). The UE policy may include a policy rule that associates an application and/or traffic thereof with a routing policy comprising an indicated RAT type for the 3GPP access. In some implementations, the UE policy may be a URSP having a list of URSP rules, where the policy rule is one of the URSP rules. Here, the URSP rule may associate an application ID of the application with the indicated RAT type for the 3GPP access.

Sometime during operation, the UE may communicate traffic in a communication session for the application via non-3GPP access (e.g., via Wi-Fi). Subsequently, the UE may discover the 3GPP access (e.g., the E-UTRAN and NG-RAN) of the 3GPP-based mobile network, using conventional or other suitable network discovery and selection mechanisms. The UE may then determine to transfer the communication session from the non-3GPP access to the 3GPP access of the 3GPP-based mobile network, in a UE-initiated handover. Here, the 3GPP-based mobile network may receive, from the UE, a message which indicates an attach request with a request type indicating a handover attach or "handover" (step 706 of FIG. 7). The message which is used to trigger the handover of the communication session may be received via a selected RAN corresponding to the indicated RAT type of the routing policy. In response to receiving the message, the 3GPP-based mobile network may manage the handover of the communication session for the application from non-3GPP access to the 3GPP access of the indicated RAT type. The 3GPP-based mobile network may then facilitate communications for the UE in the communication session for the application via the 3GPP access.

In some implementations, the 3GPP-based mobile network may be configured to provide the 3GPP access via an E-UTRAN and a NG-RAN. In this case, the indicated RAT type of the routing policy may be set to indicate one of the E-UTRAN or the NG-RAN. In some implementations, the message which indicates the attach request may be received in the 3GPP-based mobile network corresponding to a selected PLMN ID as indicated in a SIM of the UE, but the indicated RAT type of the routing policy may be set to override a RAT type associated with the selected PLMN ID as indicated in the SIM of the UE.

In some implementations, the application may be a voice application, the communication session may be a voice communication session, and the indicated RAT type of the routing policy may be set to indicate the E-UTRAN when VoNR is unavailable in the NG-RAN. In some implementations, when the required voice configurations in the NG-RAN and/or UE 210 are completed, VoNR calls will be permitted. Here, the operator may update the UE policy with respect to the voice application, such that the indicated RAT type may be set to indicate the NG-RAN, and communicate the updated UE policy to the UE.

In some other implementations, the application may be a video streaming application, the communication session may be a video streaming session, and the indicated RAT type of the routing policy may be set to indicate one of the E-UTRAN or the NG-RAN (e.g., the one that is associated with and/or determined to have the better/best quality of service or experience). In yet other implementations, the application may be a gaming application, the communication session may be a gaming session, and the indicated RAT type of the routing policy may be set to indicate one of the E-UTRAN or the NG-RAN (e.g., the one that is associated with and/or determined to have the better/best or lowest latency). The determinations may be made by the mobile network operator and/or through use of network-performed assessments of quality and/or latency.

Figure 8:
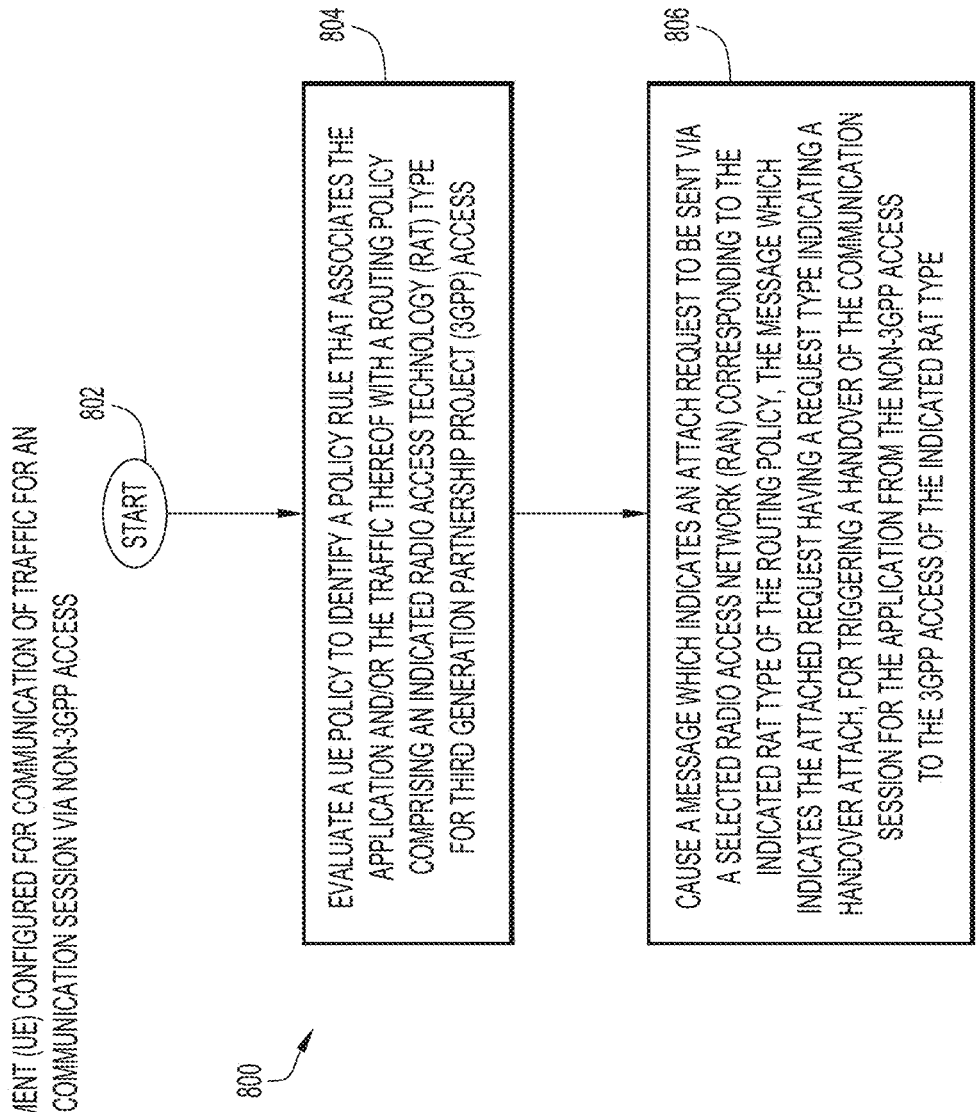
FIG. 8 is a flowchart for describing a method of using a UE policy for selection of a RAT type for UE mobility from non-3GPP access to 3GPP access according to some implementations of the present disclosure, which may be performed by the UE.

FIG. 8 is a flowchart 800 for describing a method for use in using a UE policy for selection of a RAT type for UE mobility from non-3GPP access to 3GPP access according to some implementations of the present disclosure. The method of FIG. 8 may be performed by a UE, and more particularly, by a UE having one or more processors, a non-3GPP radio transceiver operative for communication for non-3GPP access, a 3GPP radio transceiver operative for communication for 3GPP access, and one or more memory elements for storing instructions executable by the one or more processors for operation, which includes the processing steps of the method of FIG. 8. The method of FIG. 8 may be embodied in a computer program product which includes a non-transitory computer readable medium and instructions stored in the non-transitory computer readable medium, where the instructions are executable by the one or more processors of the UE.

In the method of FIG. 8, the 3GPP-based mobile network may provide communications for a UE. Initially, the UE may receive a UE policy from the 3GPP-based mobile network and store the UE policy in memory. The UE policy may include a policy rule that associates an application and/or traffic thereof with a routing policy comprising an indicated RAT type for the 3GPP access. In some implementations, the UE policy may be a URSP having a list of URSP rules, where the policy rule is one of the URSP rules. Here, the URSP rule may associate an application ID of the application with the indicated RAT type for the 3GPP access.

Sometime during its operation, the UE may operate to communicate traffic in a communication session for the application via non-3GPP access (e.g., via Wi-Fi). Subsequently, the UE may discover the 3GPP access (e.g., the E-UTRAN and the NG-RAN) of the 3GPP-based mobile network, for example, using conventional or other suitable network discovery and selection mechanisms. The UE may determine to transfer the communication session from the non-3GPP access to the 3GPP access of the 3GPP-based mobile network, in a UE-initiated handover.

Here, beginning at a start block 802 of FIG. 8, the UE may evaluate the UE policy to identify the policy rule that associates the application and/or the traffic thereof with the routing policy comprising the indicated RAT type for 3GPP access (step 804 of FIG. 8). The UE may then cause a message which indicates an attach request to be sent via a selected RAN corresponding to the indicated RAT type of the routing policy (step 806 of FIG. 8). The message which indicates the attach request has a request type indicating a handover attach or "handover." The message may be used to trigger the handover of the communication session for the application from the non-3GPP access to the 3GPP access of the indicated RAT type. Accordingly, the 3GPP-based mobile network may manage the handover of the communication session for the application from non-3GPP access to the 3GPP access of the indicated RAT type. The UE may then operate to communicate the traffic in the communication session for the application via the 3GPP access.

In some implementations, the message which indicates the attach request may be sent via the selected RAN of the 3GPP-based mobile network which is configured to provide the 3GPP access via an E-UTRAN and an NG-RAN, and the indicated RAT type of the routing policy may be set to indicate one of the E-UTRAN or the NG-RAN. In some implementations, the UE may obtain, from a PLMN selection procedure, a selected PLMN ID as indicated in a SIM of the UE. Here, the UE may cause the message which indicates the attach request to be sent via the selected RAN of the 3GPP-based mobile network corresponding to the selected PLMN ID, but use the indicated RAT type of the routing policy to override a RAT type associated with the selected PLMN ID as indicated in the SIM of the UE.

In some implementations, a selected PLMN ID as indicated in a SIM of the UE may be obtained from a PLMN selection procedure of the UE, the message which indicates the attach request may be sent via the selected RAN of a 3GPP-based mobile network corresponding to the selected PLMN ID, and the indicated RAT type of the routing policy may be used to override a RAT type associated with the selected PLMN ID as indicated in the SIM of the UE.

In some implementations, the UE operates to identify an application to be "active" prior to evaluating the UE policy to identify the appropriate policy rule for handover from non-3GPP access to 3GPP access. Here, evaluating the UE policy may involve matching an application ID of the active application and/or the traffic thereof with a traffic descriptor for identifying the policy rule. In some implementations, a plurality of applications may be identified as being active prior to evaluating the UE policy. Here, one of the applications may be set and selected as a "priority" application over other active applications for evaluating of the UE policy. In some implementations, when no active applications are identified for the handover, the evaluation of the UE policy is not performed and the handover from non-3GPP access to 3GPP access is based (only) on the selected PLMN ID and RAT type obtained from the PLMN selection procedure (i.e., the RAT type of the SIM is not overridden by any routing policy). The determinations may be made by the mobile network operator and/or through use of network-performed assessments of quality and/or latency.

In some implementations, the application may be a voice application, the communication session may be a voice communication session, and the indicated RAT type of the routing policy may be set to indicate the E-UTRAN when VoNR is unavailable in the NG-RAN of the 3GPP-based mobile network. In some other implementations, the application may be a video streaming application, the communication session may be a video streaming session, and the indicated RAT type of the routing policy may be set to indicate one of the E-UTRAN or the NG-RAN (e.g., the one that is associated with and/or determined to have the better/best quality of service or experience). In yet other implementations, the application may be a gaming application, the communication session may be a gaming session, and the indicated RAT type of the routing policy may be set to indicate one of the E-UTRAN or the NG-RAN (e.g., the one that is associated with and/or determined to have the better/best or lowest latency). The determinations may be made by the mobile network operator and/or through use of network-performed assessments of quality and/or latency.

Figure 9:
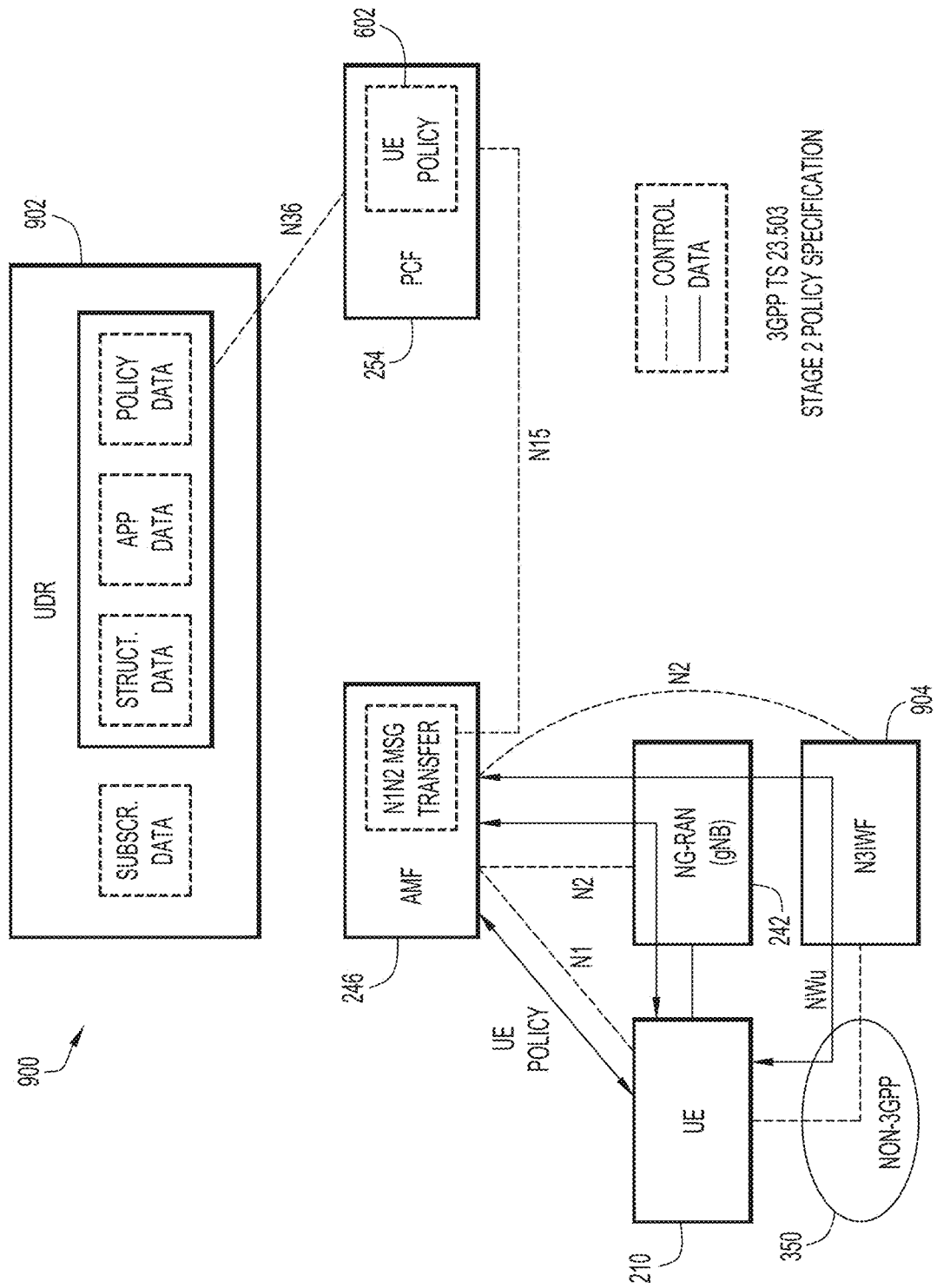
FIG. 9 is an illustrative representation of one or more control plane function entities of the mobile network which may be used to communicate the UE policy to the UE.

FIG. 9 is an illustrative representation of one or more control plane function entities 900 of a 3GPP-based mobile network for communicating a UE policy 602 to UE 210 (e.g., for use in relation to the method of FIG. 7, e.g., step 704). See, e.g., 3GPP Technical Specification (TS) 23.503, Stage 2, Policy Specification. A User Data Repository (UDR) 902 provides a Unified Data Repository service for a repository for policy data, application data, and structured data for exposure as indicated. UDR 902 may be provided for use with a UDM (e.g., HSS+UDM 256 of FIGS. 2 and 3) which serves as a front-end for user subscription data which is stored in UDR 902. The UDM may use the subscription data to execute application logic (e.g., access authorization, registration management and reachability for terminating events). Here, policy data associated with UE 210 may be selected. More specifically, PCF 254 may obtain and store UE policy 602 (including the URSP) for communication to AMF 246 in a policy delivery (e.g., via an N1 N2 message transfer). AMF 246 may communicate UE policy 602 to UE 210 via the one or more interfaces indicated in FIG. 9, via the NG-RAN (e.g., gNB 242) or even via the non-3GPP access network 350 (e.g., through a N3IWF 904).

FIG. 10 is an illustrative representation of a message formatting of a URSP having a list of URSP rules 1000 which include a URSP rule 1002. URSP rule 1002 (as well as the other URSP rules therein) may be used in connected mode mobility from non-3GPP access to 3GPP access according to some implementations. Each URSP rule in the list of URSP rules 1000 (e.g., URSP rule 1002) includes a traffic descriptor 1006 associated with a route selection descriptor list 1008 (amongst other data contents as indicated in the figure). Route selection descriptor list 1008 includes a list of route selection descriptors 1010. Each descriptor in the list of route selection descriptors 1010 (e.g., a route selection descriptor 1012) includes a route selector descriptor contents 1016 (amongst other data contents as indicated in the figure).

Figure 12:
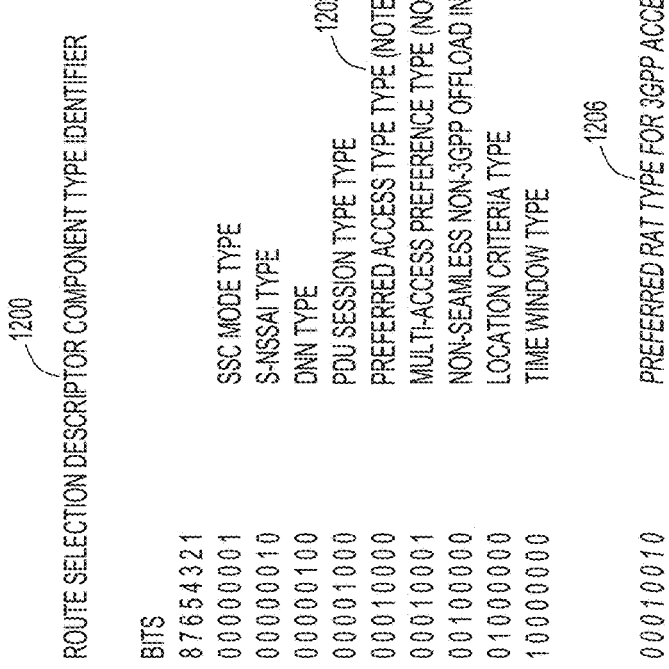
FIG. 12 are conventional data definitions associated with the route selection descriptor component type identifiers for the route selection descriptors of FIG. 10, and also including a preferred RAT type for 3GPP access according to some implementations, which may be used in connected mode mobility from non-3GPP access to 3GPP access according to some implementations of the present disclosure.

FIG. 11 are conventional data definitions associated with a traffic descriptor component type identifier 1100 for the traffic descriptor in each one of the URSP rules in the URSP of FIG. 10. These data definitions, as well as (any) newly-defined data definitions (e.g., specifically for "active" applications) may be utilized to identify a matching URSP rule for an active application according to some implementations. In addition, FIG. 12 includes conventional data definitions associated with a route selection descriptor component type identifier 1200 for each of the route selection descriptors of FIG. 10. Conventionally, the data definitions may include a "preferred access type" type 1202 having access type values 1204 for 3GPP access and non-3GPP access. According to some implementations, the data definitions may further include a "preferred RAT type for 3GPP access" type 1206 having RAT type values 1208 for E-UTRAN (or LTE) and NG-RAN (or 5G NR). In some implementations, the conventional as well as any additional suitable data definitions may be utilized for the selection of any other preferred type of network feature for use in connected mode mobility from non-3GPP access to 3GPP access according to some implementations.

Figure 13:
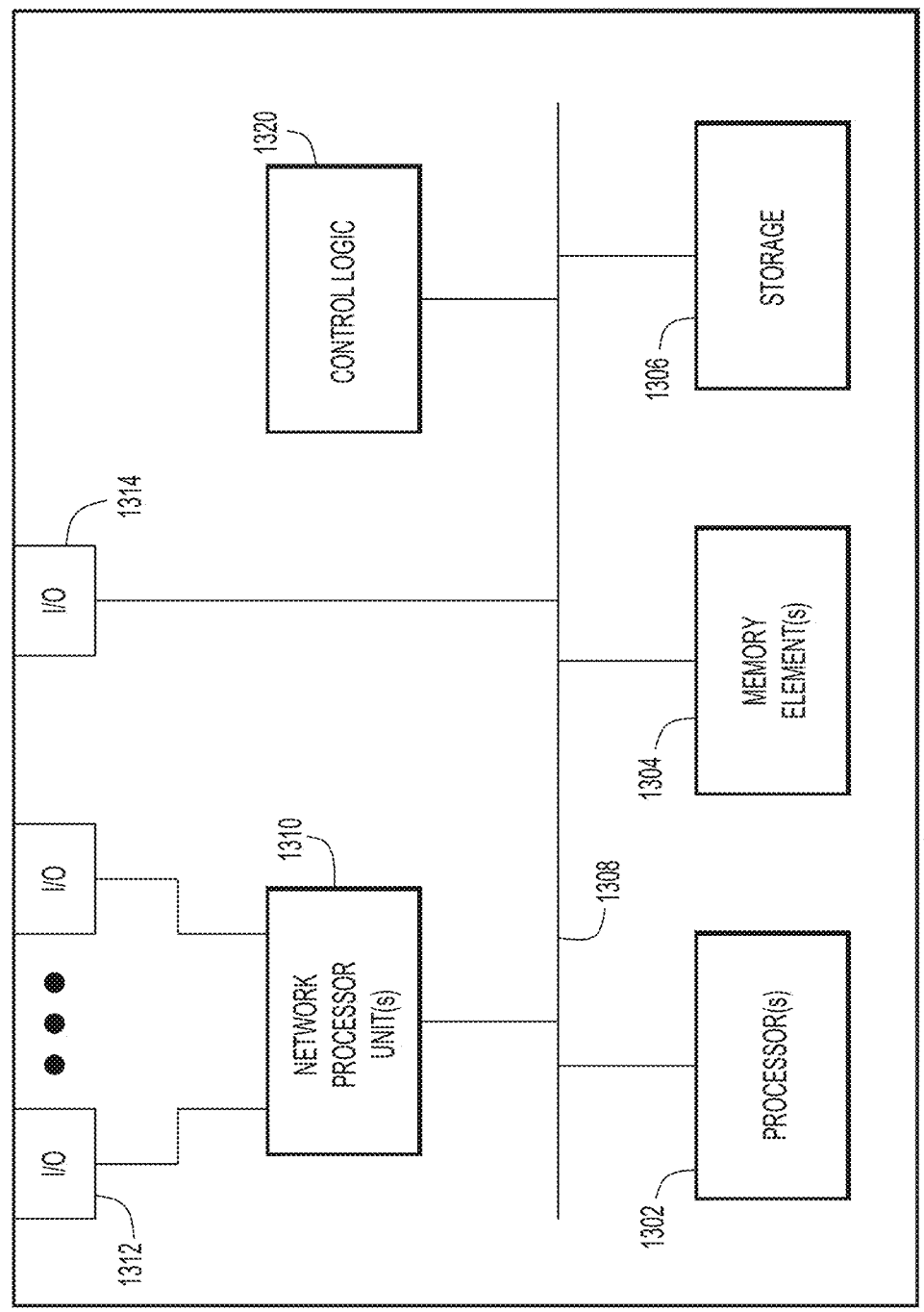
FIG. 13 illustrates a hardware block diagram of a computing device that may perform functions associated with operations of a control plane function entity according to some implementations of the present disclosure.

FIG. 13 illustrates a hardware block diagram of a computing device 1300 that may perform functions associated with operations discussed herein in connection with the techniques described in relation to the above figures. In various embodiments, a computing device, such as computing device 1300 or any combination of computing devices 1300, may be configured as any entity/entities as discussed for the techniques depicted in connection with the figures in order to perform operations of the various techniques discussed herein. In particular, computing device 1300 may perform operations of a control plane function entity (e.g., one or more control plane function entities for mobility management in a 3GPP-based mobile network; an MME, an AMF, a PCF, and/or combinations thereof; etc.) for operation in accordance with the method of FIG. 7 and/or associated techniques.

In at least one embodiment, computing device 1300 may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for computing device 1300 can overlap in any manner and are not limited to the specific allocation of instructions and/or operations described herein.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with memory element(s) 1304 (or vice versa), or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, and/or any other I/O port(s) now known or hereafter developed. Thus, the network processor unit(s) 1310 and/or network I/O interface(s) 1312 may include suitable interfaces for receiving, transmitting, and/or otherwise communicating data and/or information in a network environment.

I/O interface(s) 1314 allow for input and output of data and/or information with other entities that may be connected to computing device 1300. For example, I/O interface(s) 1314 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1304 and/or storage 1306 can store data, software, code, instructions (e.g., processor instructions), logic, parameters, combinations thereof, and/or the like used for operations described herein. This includes memory element(s) 1304 and/or storage 1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 14:
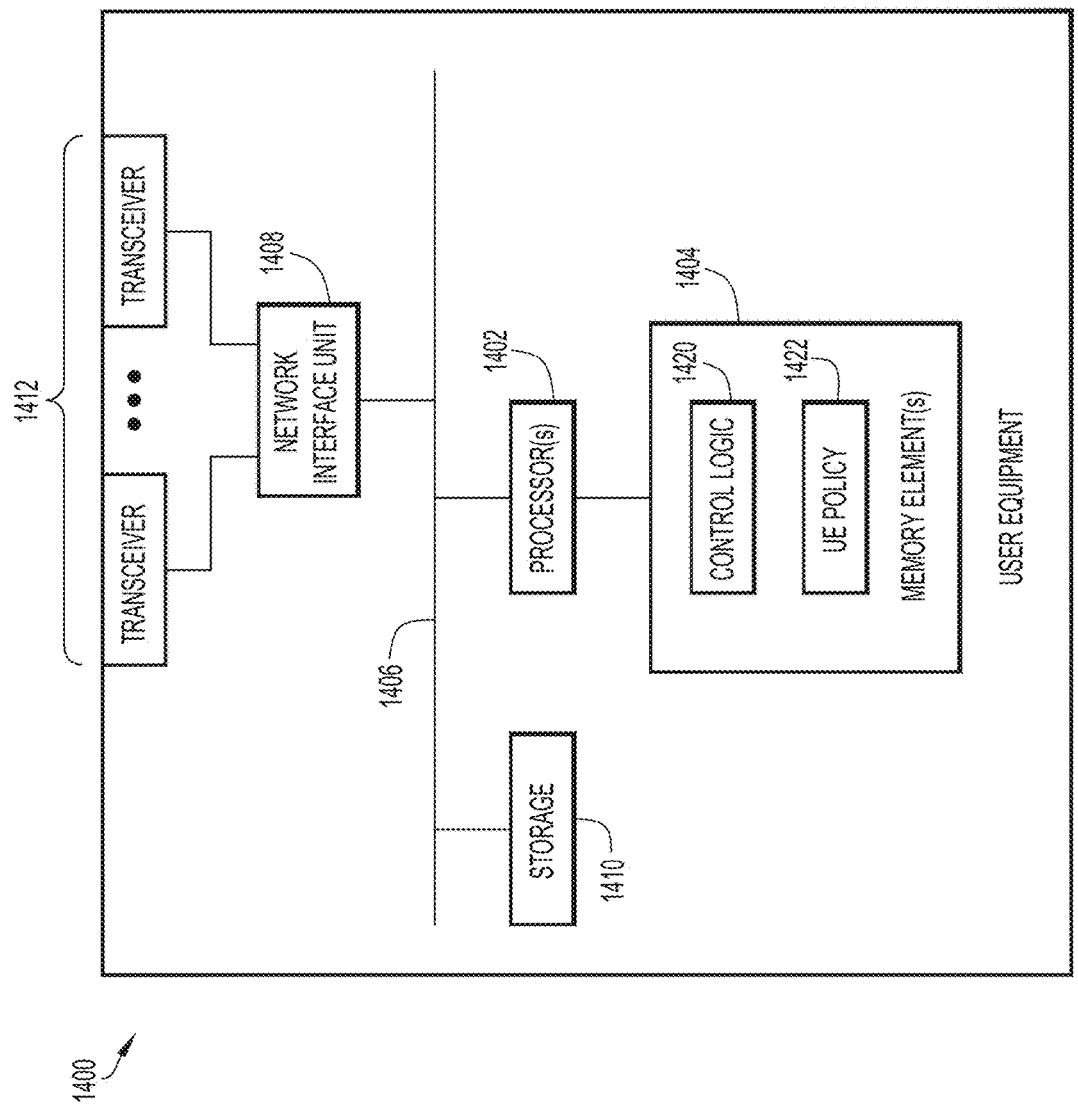
FIG. 14 illustrates a hardware block diagram of a UE that may perform functions according to some implementations of the present disclosure.

Referring now to FIG. 14, FIG. 14 is a simplified block diagram illustrating example details associated with a UE 1400 configured to operate as described herein, according to an example embodiment. In at least one embodiment, UE 1400 may include the processing and features as discussed for the UE (e.g., UE 210) in the previous figures. The embodiment of FIG. 14 illustrates UE 1400, which includes one or more processor(s) 1402, one or more memory element(s) 1404, a bus 1406, a network interface unit 1408, and storage 1410. Memory element(s) 1404 may include instructions for control logic 1420. In some embodiments, memory element(s) 1404 may be configured to store a UE policy 1422 (e.g., including the URSP) for UE 1400.

In at least one embodiment, processor(s) 1402 is/are at least one hardware processor configured to execute various tasks, operations, and/or functions for UE 1400 as described herein according to software and/or instructions configured for UE 1400. In at least one embodiment, memory element(s) 1404 is/are configured to store data, information, software and/or instructions associated with UE 1400 and logic configured for memory element(s) 1404. In at least one embodiment, bus 1406 can be configured as an interface that enables one or more elements of UE 1400 (e.g., network interface unit 1408, processor(s) 1402, memory element(s) 1404 (and logic configured therein), etc. to communicate in order to exchange information and/or data. In at least one embodiment, a fast kernel-hosted interconnect may be employed for UE 1400, potentially using shared memory between processes, which can enable efficient communication paths between the processes.

In various embodiments, network interface unit 1408 enables communication between UE 1400 and other network elements, via one or more transceivers 1412 (e.g., receive and transmit units) at which traffic is received and transmitted to facilitate operations discussed for various embodiments described herein. In some embodiments, network interface unit 1408 can be configured with one or more radio access network interface driver(s) and/or controller(s) to enable communications for UE 1400 within the mobile network. UE 1400 can include any suitable interfaces for receiving, transmitting, and/or otherwise communicating data or information in a network environment.

In various embodiments, UE 1400 may be capable of performing over-the-air, RF communications for non-3GPP access (e.g., Wi-Fi) and 3GPP access (e.g., 4G/E-UTRAN/LTE and 5G/NR/NG-RAN). In some embodiments, UE 1400 may also be capable of performing over-the-air communications for other communications standards, such as 3GPP 2G and/or 3G accesses, WiMax, IEEE Standard 802.16™-2012, Radio-frequency Identification (RFID), Near Field Communication (NFC), Bluetooth™, etc.

In various embodiments, storage 1410 can be configured to store data, data structures, databases, information, instructions, and/or the like associated with UE 1400 and/or logic configured for memory element(s) 1404. Note that in certain examples, storage 1410 can be consolidated with memory elements 1404 (or vice versa), and/or the storage/memory elements can overlap/exist in any other suitable manner.

In various embodiments, UE policy 1422 (e.g., the URSP) may include any information, data, data structures, or the like indicating routing policies to facilitate various operations as discussed herein. In some embodiments, UE policy 1422 may be received via the network (e.g., via the 3GPP-based mobile network); in other embodiments, UE policy 1422 may be preconfigured by an equipment manufacturer for UE 1400.

In at least one embodiment, control logic 1420 can include instructions that, when executed (e.g., by processor(s) 1402), cause UE 1400 to perform operations, which can include, but not be limited to providing control and/or management operations for UE 1400; cooperating and/or interacting with other logic; maintaining and/or interacting with stored data, information, parameters (e.g., memory element(s), storage, data structures, databases, tables, etc.); performing attaches/handovers to various access elements, performing session creation processes/exchanges with one or computing and/or networking entities; cooperating and/or interacting with other logic; maintaining and/or interacting with stored data, information, parameters (e.g., memory element(s), storage, data structures, databases, tables, etc.); combinations thereof; and/or the like to facilitate any operations as discussed for various embodiments described herein.

In various embodiments, memory element(s) 1404 may include any suitable memory element such as RAM, DRAM, SRAM, and/or cache memory. In general, memory element(s) 1404 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 1410 may include any suitable storage such as persistent storage, which may be a magnetic disk drive, a solid-state hard drive, a semiconductor storage device, ROM, EPROM, flash memory, and/or any other computer readable storage media, which may be inclusive of non-transitory tangible media and/or non-transitory computer readable storage media, that is capable of storing program/logic/software instructions and/or digital information. In some embodiments, the media used by storage 1410 may also be removable. For example, a removable hard drive may be used for storage 1410. Other examples include optical and magnetic disks, thumb drives, and smart cards that are inserted into a drive for transfer onto another computer readable storage medium that is also part of storage 1410.

Techniques and mechanisms are described herein for providing and using a UE policy for use in selection of a RAT type (or other preferred type of network feature) for UE mobility from non-3GPP access to 3GPP access.

In one illustrative example, a UE policy may be communicated (e.g., by the network and/or network entity) for receipt by a UE. The UE policy may include a policy rule that associates an application and/or traffic thereof with a routing policy comprising an indicated RAT type for 3GPP access. A message which indicates an attach request may be received from the UE via a selected RAN corresponding to the indicated RAT type of the routing policy. The message which indicates the attach request may have a request type indicating a handover attach, for triggering a handover of a communication session for the application from non-3GPP access to the 3GPP access of the indicated RAT type. In some implementations, the UE policy comprises a URSP and the policy rule comprises a URSP rule. In some implementations, the message which indicates the attach request may be received in a 3GPP-based mobile network which is configured to provide the 3GPP access via an E-UTRAN and a NG-RAN, and the indicated RAT type of the routing policy may be set to indicate one of the E-UTRAN or the NG-RAN. In further implementations, the application comprises a voice application, the communication session comprises a voice communication session, and the indicated access technology type of the routing policy is set to indicate the E-UTRAN when VoNR is unavailable in the NG-RAN of a 3GPP-based mobile network.

In relation to the above illustrative example, a network node may comprise one or more processors; one or more interfaces to connect for network communication; one or more memory elements for storing instructions executable by the one or more processors for operation as a control plane function entity (e.g., for mobility management), including for performing the processing/messaging steps of the method(s) as described. In addition, a computer program product may comprise a non-transitory computer readable medium and instructions stored in the non-transitory computer readable medium, where the instructions are executable by one or more processors of a network node having a control plane function entity (e.g., for mobility management), including for performing the processing/messaging steps of the method(s) as described.

In another illustrative example, a UE may be configured to operate to communicate traffic for an application in a communication session via non-3GPP access. The UE may operate to evaluate a UE policy to identify a policy rule that associates the application and/or the traffic thereof with a routing policy comprising an indicated RAT type for 3GPP access. The UE may further operate to cause a message which indicates an attach request to be sent via a selected RAN corresponding to the indicated RAT type of the routing policy. The message which indicates the attach request may have a request type indicating a handover attach, for triggering a handover of the communication session for the application from the non-3GPP access to the 3GPP access of the indicated RAT type. In some implementations, the UE policy may comprise a URSP and the policy rule comprises a URSP rule. In some implementations, the message which indicates the attach request may be sent to a 3GPP-based mobile network which is configured to provide the 3GPP access via an E-UTRAN and an NG-RAN, and the indicated RAT type of the routing policy may be set to indicate one of the E-UTRAN or the NG-RAN. In further implementations, the application comprises a voice application, the communication session comprises a voice communication session, and the indicated access technology type of the routing policy is set to indicate the E-UTRAN when VoNR is unavailable in the NG-RAN of the 3GPP-based mobile network.

In relation to the above-illustrative example, a UE may comprise one or more processors; a non-3GPP radio transceiver operative for communication for non-3GPP access; a 3GPP radio transceiver operative for communication for 3GPP access; and one or more memory elements for storing instructions executable by the one or more processors for operation, including for performing the processing/messaging steps of the method(s) as described. In addition, a computer program product may comprise a non-transitory computer readable medium and instructions stored in the non-transitory computer readable medium, where the instructions are executable by one or more processors of a UE, including for performing the processing/messaging steps of the method(s) as described.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), VLAN, wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combined multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
at a user equipment (UE) configured to operate to communicate traffic for an application in a communication session via non-Third Generation Partnership Project (3GPP) access,
evaluating a UE policy to identify a policy rule that associates the application and/or the traffic thereof with a routing policy comprising an indicated radio access technology (RAT) type for 3GPP access; and
causing a message which indicates an attach request to be sent via a selected radio access network (RAN) corresponding to the indicated RAT type of the routing policy, the message which indicates the attach request having a request type indicating a handover attach, for triggering a handover of the communication session for the application from the non-3GPP access to the 3GPP access of the indicated RAT type, wherein the indicated RAT type of the routing policy is set to override a RAT type associated with a selected Public Land Mobile Network (PLMN) ID as indicated in a Subscriber Identity Module (SIM) of the UE.

2. The method of claim 1, wherein the UE policy comprises a UE Route Selection Policy (URSP) and the policy rule comprises a URSP rule.

3. The method of claim 2, wherein the URSP rule associates an application ID of the application with the indicated RAT type for the 3GPP access.

4. The method of claim 1, wherein:
the message which indicates the attach request is sent via the selected RAN of a 3GPP-based mobile network configured to provide the 3GPP access via an Evolved Universal Terrestrial Radio Access Network (E-UTRAN) and a Next Generation RAN (NG-RAN), and
the indicated RAT type in the routing policy is set to indicate one of the E-UTRAN or the NG-RAN.

5. The method of claim 4, wherein the application comprises a voice application, the communication session comprises a voice communication session, and the indicated RAT type of the routing policy is set to indicate the E-UTRAN when Voice over NR (VONR) is unavailable in the NG-RAN of the 3GPP-based mobile network.

6. The method of claim 4, wherein the application comprises a video streaming application, the communication session comprises a video streaming session, and the indicated RAT type of the routing policy is set to indicate one of the E-UTRAN or the NG-RAN associated with a better quality of service or experience.

7. The method of claim 1, further comprising:
at the UE,
obtaining, from a public land mobile network (PLMN) selection procedure, a selected PLMN ID as indicated in the SIM of the UE,
wherein the message which indicates the attach request is sent via the selected RAN of a 3GPP-based mobile network corresponding to the selected PLMN ID.

8. The method of claim 1, wherein the UE policy has a plurality of policy rules including the policy rule, the method further comprising:
at the UE,
identifying that the application is active, prior to evaluating the UE policy to identify the policy rule;
wherein evaluating the UE policy comprises matching an application ID of the application and/or the traffic thereof with a traffic descriptor of the policy rule; and
after the handover, operating to communicate the traffic for the application in the communication session via the 3GPP access.

9. A user equipment (UE) comprising:
one or more processors;
a non-Third Generation Partnership Project (non-3GPP) radio transceiver operative for communication for non-3GPP access;
a 3GPP radio transceiver operative for communication for 3GPP access; and
one or more memory elements for storing instructions executable by the one or more processors for operation, including:
operating to communicate traffic for an application in a communication session via non-3GPP access;
evaluating a UE policy to identify a policy rule that associates the application and/or the traffic thereof with a routing policy comprising an indicated radio access technology (RAT) type for the 3GPP access; and
causing a message which indicates an attach request to be sent via a selected radio access network (RAN) corresponding to the indicated RAT type of the routing policy, the message which indicates the attach request having a request type indicating a handover attach, for triggering a handover of the communication session for the application from the non-3GPP access to the 3GPP access of the indicated RAT type, wherein the indicated RAT type of the routing policy is set to override a RAT type associated with a selected Public Land Mobile Network (PLMN) ID as indicated in a Subscriber Identity Module (SIM) of the UE.

10. The UE of claim 9, wherein the UE policy comprises a UE Route Selection Policy (URSP) and the policy rule comprises a URSP rule.

11. The UE of claim 9, wherein the instructions are executable by the one or more processors for causing the message which indicates the attach request to be sent via the selected RAN of a 3GPP-based mobile network which is configured to provide the 3GPP access via an Evolved Universal Terrestrial Radio Access Network (E-UTRAN) and a Next Generation RAN (NG-RAN), and the indicated RAT type of the routing policy is set to indicate one of the E-UTRAN or the NG-RAN.

12. The UE of claim 11, wherein the application comprises a voice application, the communication session comprises a voice communication session, and the indicated RAT type of the routing policy comprises the E-UTRAN when Voice over NR (VONR) is unavailable in the NG-RAN of the 3GPP-based mobile network.

13. The UE of claim 9, wherein the instructions are executable by the one or more processors for operation further including:
obtaining, from a public land mobile network (PLMN) selection procedure, a selected PLMN ID as indicated in the SIM of the UE,
wherein the message which indicates the attach request is sent via the selected RAN of a 3GPP-based mobile network corresponding to the selected PLMN ID.

* * * * *